Dec. 27, 1938.     R. H. DRAEGER     2,141,176
LOOSE SHEET CAMERA
Filed Aug. 20, 1937     2 Sheets-Sheet 1

INVENTOR.
RUPERT H. DRAEGER.
BY Robert A. Lavender
ATTORNEY

Dec. 27, 1938.   R. H. DRAEGER   2,141,176
LOOSE SHEET CAMERA
Filed Aug. 20, 1937   2 Sheets-Sheet 2
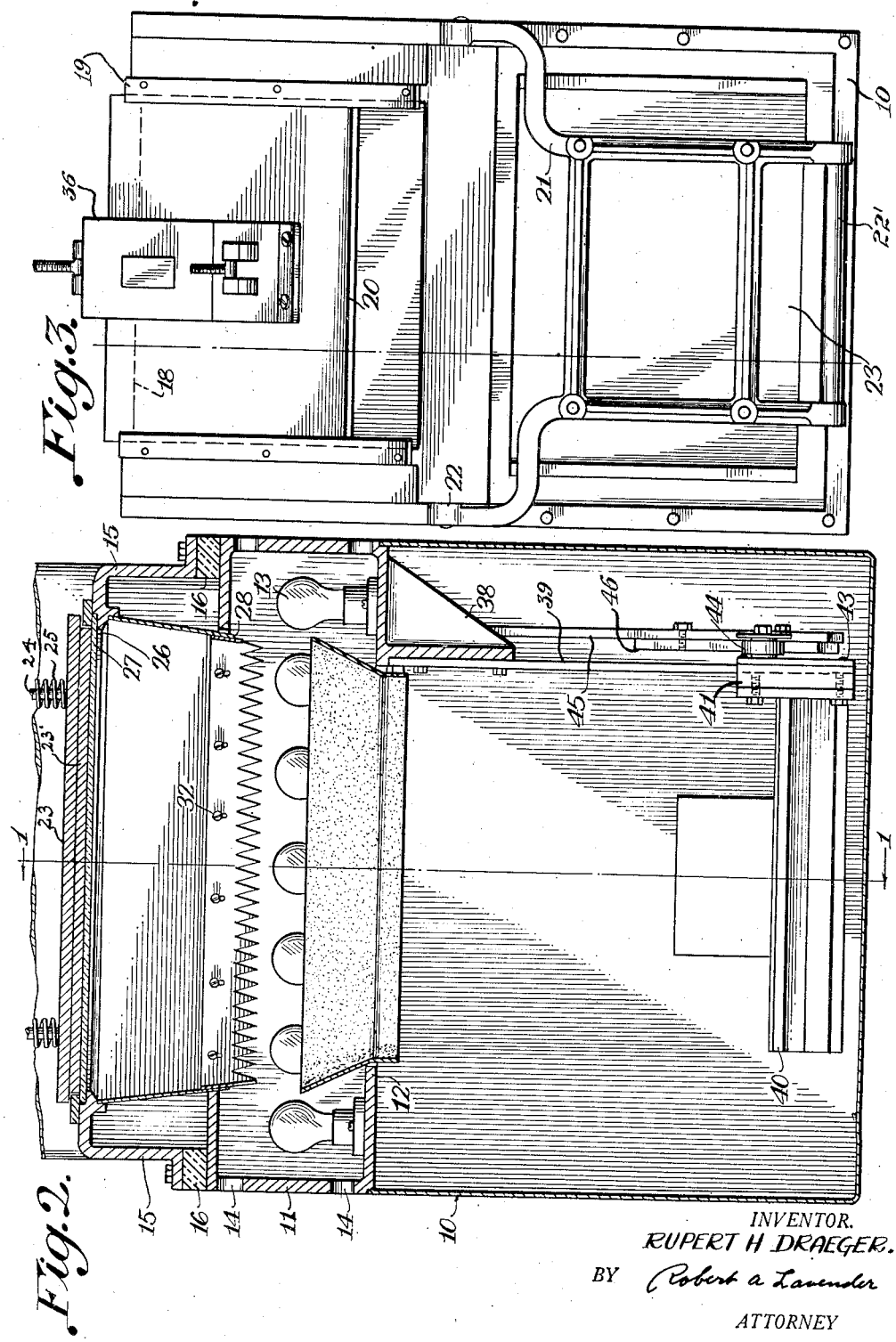
INVENTOR.
RUPERT H DRAEGER.
BY Robert a Lavender
ATTORNEY Patented Dec. 27, 1938

2,141,176

UNITED STATES PATENT OFFICE 2,141,176

LOOSE SHEET CAMERA

Rupert H. Draeger, United States Navy

Application August 20, 1937, Serial No. 160,044

7 Claims. (Cl. 88—24)

(Granted under the act of March 3, 1883, as amended April 30, 1928; 370 O. G. 757)

It is an object of this invention to provide a portable, completely self-contained copying apparatus requiring only a source of electrical energy and a minimum of effort on the part of an operator photographically to copy loose sheets of printed matter, manuscripts or the like.

A further object of this invention is the provision in an enclosed unit, having a flat transparent surface upon which an object to be copied may be placed, of means for uniformly illuminating the under side of said surface, means for photographing the object placed on said surface, and means for preventing the straying of light from the illuminating means into the camera.

Another object of this invention is the provision of a reflecting means for directing light from the object being copied to the camera, whereby the dimensions of the apparatus are reduced to a minimum.

Still a further object is the provision of means whereby a motion of the camera shifts the previously mentioned reflecting means to alter the optical path from the object to be copied to the camera, and thereby shifts the center of the field of the camera on the object support in such a manner that an edge of various size objects may be placed against a fixed stop and yet when the camera is placed in the proper position to copy just the correct height of object, it will be centered upon that object.

Included in the previously mentioned objects is the use of mechanisms for automatically focusing the camera lens, automatically controlling the camera shutter and timing the exposure, automatically turning the illuminating means on and off, automatically advancing or indexing unexposed film into the camera film gate at the end of an exposure, and means for automatically adjusting the amount of film indexed to the length of the aperture of an adjustable film gate, and single means for holding in place an object to be copied and making an exposure with the camera. Mechanisms for performing the functions mentioned in the previous paragraph are disclosed in my copending application Serial Nos. 20,613, filed May 9, 1935, on a Camera indexing mechanism; 24,689, filed June 3, 1935, on a Camera shutter; 92,745, filed July 27, 1936, on Copying apparatus; 137,966, filed April 20, 1937, on a Light trap; 135,266, filed April 6, 1937, on an Adjustable multiple width film gate; and in my Patent No. 2,073,627, issued March 16, 1937.

Another object of the invention is to provide a copying unit having the camera at a convenient level for mounting the film magazine thereon.

Still another object of the invention is to provide a copying unit which may be readily operated by the average person and which may be manufactured economically.

Other objects and advantages of this invention will be readily apparent from the following detailed description and the accompanying drawings, wherein Fig. 1 is an elevational sectional view taken at line 1—1 of Fig. 2 of the copying apparatus of this invention, the camera being shown unbroken and the camera film magazine being omitted;

Fig. 2 is a sectional elevational view taken at line 2—2 of Fig. 1; and

Fig. 3 is a plan view of the copying unit of this invention.

Figure 1:
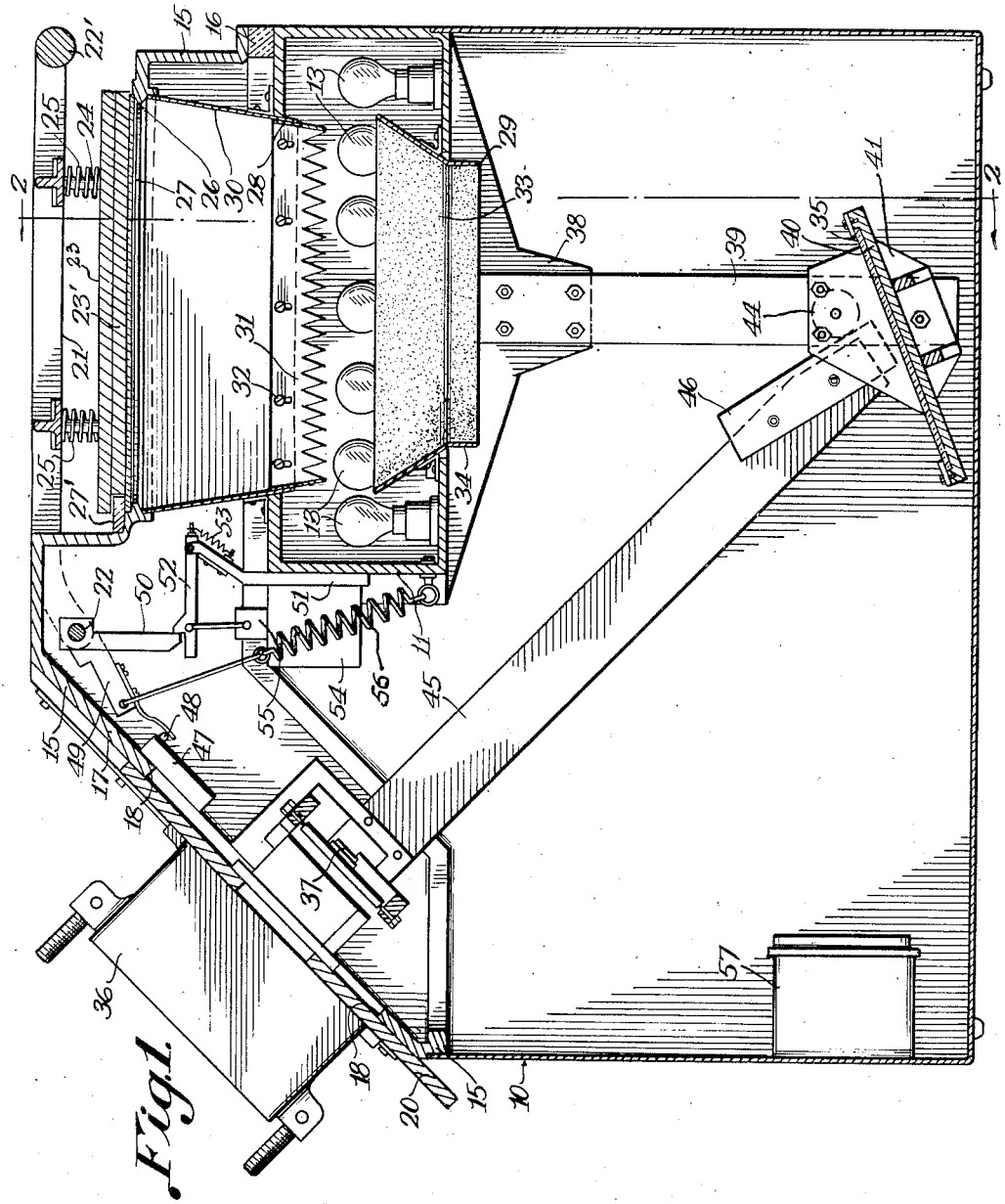

At 10 there is shown a housing to the back of which is secured a rectangular bracket 11 having an inwardly protruding shelf 12 which carries a number of small lamps 13; such as automobile headlight bulbs or the like, arranged into a rectangle. These lamps may conveniently be connected in series or parallel, so as to operate on the usual 110-volt line, or on an automobile generator or storage battery. Holes 14 in the side walls of bracket 11 are provided to ventilate the lamps 13.

A top 15 is secured to bracket 11 in the front and to housing 10 in the rear, heat-insulating material 16 being placed between housing 10 and top 15 for protection from the heat from lamps 13. The face 17 of the top 15 slopes at an angle and has a rectangular aperture 18 therein. Ways 19 are provided at the sides of aperture 18 slidably to carry a camera supporting plate 20.

A platen supporting frame 21 pivotally mounted as at 22 to top 15, has a handle 22' mounted across the front for convenient manual operation and carries a padded platen 23 suspended therefrom by rods 24 which are slidably mounted in the frame 21 and secured between said frame and the platen 23. Helical compression springs 25 encircle the rods 24 and urge the platen 23 away from the frame 21.

The top 15 is formed with an aperture 26 for holding a glass plate 27 upon which material to be photographed may be placed face downwardly. The bracket member 11 is apertured top and bottom as at 28 and 29, respectively. Between the apertures 26 and 28 reflectors 30 are mounted so as to direct light from the lamps 13 to the glass plate 27. These reflectors 30 may be adjustably mounted so as to permit a variation of intensity and distribution of that portion of the light reaching the glass plate 27 which is reflected from these surfaces. Toothed vignetters or partially light shielding members 31 are adjustably suspended as at 32 from the periphery of the aperture 28, for intercepting that portion of the light from each lamp which would have a short direct path to the glass plate 27, so that no light from the lamps. 13 is reflected by glass plate 27 to the interior of the housing 10. The aperture 29 has mounted therein a reflector 33 having the upper portion flared out at such an angle as to direct incident light from lamps 13 to glass plate 27. The relative positions of the filaments of the lamps 13 and the top edge of the reflector 33 is such that no direct rays of light from the lamps will be incident upon aperture 29. A depending portion 34 of the reflector 33 is provided and may be painted black as an added precaution against direct or stray reflected light entering the housing 10 through the aperture 28.

The above described disposition of lights, reflectors and shields is arranged for uniformly illuminating an area from a nearby source or sources of light, although the aperture is large and is directly in front of said area. Substantially all of the light that passes through the aperture is reflected only from said area.

A movable mirror 35 is placed within the housing 10 on a slant. A camera 36 having an objective lens 37, is secured to and protrudes through the plate 20. The objective lens 37 points at the mirror 35, and the mirror is at the proper slant to reflect light from glass plate 27 to said objective lens 37. This arrangement reduces the over-all height of the entire unit.

The shelf 12 has a depending bracket 38 to which is secured a rectangular depending rod 39. Upon this rod 39 a frame 40, adapted to hold the mirror 35 at a fixed slant, is slidably mounted by means of a way 41, to which the frame 40 is secured. Having the mirror support or frame 40 and the way 41 in two pieces permits of adjustment of the position of the mirror 35. Plate 43 fastened to 41 has a roller 44 secured thereto. The camera carrying plate 20 has an arm 45 secured thereto and the arm 45 has a bearing plate 46 secured thereto near its lower extremity, said bearing plate being so placed as to exert a vertical component of force upon the roller 44 when the plate 20 is moved upwardly along the sloping face 17 of the top 15. This force raises the mirror 35 when the camera 36 is raised, gravity sufficing to lower the mirror when the camera is lowered. Thus the optical distance from the camera 36 to the glass plate 27 may be lengthened or shortened by sliding the camera 36 in a direction normal to its axis, along face 17.

The bearing plate 46 is placed at such a slope as to cause the mirror 35 to be raised a greater distance than would be necessary to keep the central normal ray from the glass plate 27 reflected into and along the axis of the camera 36 when the latter is moved upwardly on the face 17. This excessive movement of the mirror along its path with respect to that of the camera along its path, is necessary to cause the center of the area covered by the camera to move toward the back of the glass plate 27 as the camera 36 is moved upwardly on the face 17. This permits a fixed stop 27' to be used to center in the field of the camera varying height objects to be copied. In order to accomplish this shift of the center of the objective field, the slope of the plate 46 must be less than forty-five degrees to the rays reflected normally through the glass plate 27 to the mirror 35. If this slope of the plate 46 must be more than forty-five degrees, the mirror 35 will travel slower than the camera 36 and the center of the objective field will shift toward the front of the glass plate 27, thus similarly permitting a fixed stop to be used in front of plate 27 for centering various size sheets in the objective field.

The lens 37 of the camera 36 may be automatically focused as the camera is moved, by any of the well-known methods. A convenient and simple mechanism for accomplishing this result is described in my previously mentioned copending application Serial No. 92,745, filed July 27, 1936.

Mechanism for automatically indexing roll film and for timing the exposure may also be included in the camera. Such mechanism may conveniently be operated by means of a micro-switch or push button 47 secured to the top 15 through the agency of a spring lever 48 secured to an arm 49 of the pivotally mounted platen frame 21. The spring or arm 48 is so adjusted that it touches the button 47 when the platen 23 is brought into contact with the glass plate 27 or any thin material placed thereon and is pushed ingardly to close a contact when padding 23' on the under side of platen 23 is compressed by manually pushing down on the handle 22'. When a micro-switch is used this pressure on handle 22' need be sufficient to compress the padding 23' only a few hundredths of an inch, for the button 47 need move only about a thousandth of an inch. Spring 48 may be quite stiff.

A second arm 50 extends from the platen hinge rod 22. By means of arm 50 said frame may be held in the closed position as shown in the drawings. A bifurcated arm 51 secured to bracket 11 carries a sear 52 pivotally mounted thereon and adapted to engage the second arm 50. A tension spring 53 is suspended between the bifurcated arm 51 and the sear 52 and urges the catch on 52 into the position for holding the frame 21 closed. An electromagnet 54 is mounted on bracket 11 and has an armature 55 connected to sear 52 in such a manner that when the electromagnet 54 is energized, the sear 52 is moved down in opposition to the spring 53 to release the arm 50 of the hinge rod 22. A larger helical tension spring 56 connects the arm 49 with the bracket 11. When 50 is released, spring 56 raises the frame 21 and the platen 23 by rotating them about pivot 22.

The switch 47, a relay 57, lamps 13, electromagnet 54 and the camera shutter and film indexing mechanism are electrically connected as shown and described in my previously mentioned copending application on copying apparatus. The mechanisms are so connected that when handle 22' is moved to platen closed position, the micro-switch 47 operates an electromagnetic switch in the automatic timing device which simultaneously lights lamps 13, opens an electromagnetically controlled camera shutter and sets the automatic timing device in motion. The circuit of lamps 13 is closed by the relay 57 which also breaks the circuit through the previously mentioned switch 47, thereby stopping the flow of current through the timing device.

At the end of the exposure as determined by the timing device, the shutter and light circuits are broken, a momentary electrical impulse energizes the electromagnet 54, releasing the platen so that it will be raised to open position by the spring 56. A motor in the camera 36 will be energized just long enough to operate a sprocket-wheel or other film advancing mechanism to index the proper amount of film through the film gate of the camera. This amount is automatically determined by the length of the aperture in the film gate, which length is manually adjustable. These mechanisms are described in my previously mentioned applications on Indexing mechanisms and my Patent No. 2,073,627, issued March 16, 1937 on an Adjustable film gate.

To operate this copying unit the sheet to be copied is placed face down on the glass plate 27 and its size is read on a scale (not shown) at the edge of the glass 27. This scale reading is then set on the adjustable film gate scale (not shown) which may be conveniently placed on plate 20. This latter scale is set by sliding the camera 36 and the plate 20 along the face 17, as previously described. This motion adjusts for each reduction ratio both the lens 37 and the optical path from the glass plate 27 to the camera lens 37, the latter depending partially upon the positioning of the mirror 35, to the correct positions for just covering the sheet as scaled on the plate 27. The operator will, therefore, be concerned only with the position of the camera with respect to the dimensions of the object to be copied.

With the object to be copied in its place, the operator has merely to close the platen 23 by using handle 22' and the entire cycle, terminating with the raising of the platen and the placing of unexposed film in the film gate, is automatic and leaves the unit ready for the removal of the object just copied and for the insertion of the next object.

The invention described herein may be manufactured and used by or for the Government of the United States of America for governmental purposes without the payment of any royalties thereon or therefor.

I claim:

1. In a copying apparatus, a casing, an aperture therein, a transparent plate in said aperture upon which material to be photographed may be placed face downwardly, a photographic camera, a mounting for said camera moveable in cooperative relation with an aperture in said casing, means for illuminating said transparent plate from below, whereby when material to be copied lies upon said plate, the incident rays will be reflected thereby, a movable mirror in said casing in cooperative relation with said transparent plate and with said camera, and means for automatically controlling the moving of said mirror, upwardly toward said plate in correspondence with the movement of said camera-mounting.

2. In a copying apparatus, a casing, at least a portion of which is flat, and a transparent plate in said portion, a photographic camera, a mounting for said camera in cooperative relation with an aperture in said casing, means for illuminating said transparent plate upon which material to be photographed may be placed face downwardly, and whereby light rays incident thereupon are reflected, a movable mirror in said casing in cooperative relation with said camera and said transparent plate, means for varying the length of the path of the light reflected from said plate by way of said mirror to the camera, and automatically operable therefrom, and means for centering in the photographic field of said camera, various sized objects placed against a fixed stop on said transparent portion.

3. In a copying apparatus, a casing, at least a portion of which is transparent, a photographic camera, a mounting for said camera in cooperative relation with an aperture in said casing, means for illuminating said transparent portion, a movable mirror in said casing in cooperative relation with said camera and with said transparent portion, means controlled by said camera for controlling the moving of said mirror, said means consisting of a camera-carrying plate having an arm extending therefrom and adapted to engage with and exert a vertical component of force upon a roller mounted on a way on the mirror support, said way being adapted to slide upon a vertical rod mounted in the casing below said transparent plate, manual means for holding objects to be copied against said transparent portion, means for holding said manual means in the actuated position, and means for releasing said manual means.

4. In a loose sheet copying apparatus, a casing, a transparent plate in said casing, a photographic camera, a mounting for said camera in cooperative relation with an aperture in said casing, means in said casing for illuminating said transparent plate, a mirror having slidable mounting in said casing in alignment with said transparent plate, means controlled by said camera for controlling movement of said mounting and means for setting said mirror with respect to the focal axis of the camera and the vertical axis of the light reflected from said transparent plate whereby the angles of incidence and reflection will remain constant throughout the vertical travel of the mirror upon its slidable mounting, manual means for pressing sheets against said glass plate, means for holding said manual means in the actuated position, and an electromagnet for releasing said manual means.

5. In a loose sheet copying apparatus, a casing, a transparent plate in said casing, a photographic camera, a slidable mounting for said camera in cooperative relation with an aperture in said casing, means in said casing for illuminating said transparent plate, a reflector open at the top and the bottom and extending from a point just below the transparent plate towards the illuminating means, a mirror having a slidable mounting in the lower portion of said casing in alignment with said transparent plate, means controlled by the positioning of said camera for controlling the movement of said mounting, a second reflector also open at the top and the bottom and in alignment with the first mentioned reflector and extending from the illuminating means towards said mirror, manual means for pressing sheets against said transparent plate, a spring-pressed catch for holding said manual means in the actuated position, and an electromagnet for releasing said catch.

6. In a loose sheet copying apparatus, a casing having a top, said top having a flat and a slanting portion, both of which are apertured, a transparent plate in the aperture of the flat portion of the top, a photographic camera, a slidable mounting for said camera in cooperative relation with the aperture in the slanting portion of said top, a plurality of lamps in said casing arranged in a rectangular pattern to illuminate said transparent plate, a reflector open at the top and the bottom and extending from a point just below the transparent plate to a point near the tops of the lamps, a toothed shield adjustably mounted on the lower edge of said reflector, a mirror having a slidable mounting in the lower portion of said casing in alignment with said transparent plate, a roller for controlling the movement of said mounting, an arm attached to said camera engaging said roller, a second reflector also open at the top and the bottom, in alignment with the first mentioned reflector and extending from a point below the tops of the lamps to a point below the bases thereof, manual means for pressing sheets against said transparent plate, a spring-pressed catch for holding said manual means in the actuated position, and an electromagnet for releasing said catch.

7. In an apparatus for photographically copying matter printed upon a loose sheet, the combination of a casing, a transparent horizontal plate in the top of said casing adapted to support the sheet to be copied, a side of said casing adjacent said top being sloped relatively to said top, an aperture in said side, a photographic camera, a mounting for said camera on said side in co-operative relation with said aperture, said mounting including a camera-carrying plate adapted to move in sliding engagement with the sloping side of said casing; means within said casing for illuminating the under-side of said transparent plate, said illuminating means comprising a light source and a reflector system, the latter including a member above the said source and a member below said source, whereby the maximum of indirect illumination falls upon the transparent plate, and whereby the reflected light rays incident thereupon will be reflected by it vertically downward while the printed sheet is in position to be copied; a mirror movably mounted within said casing and below said transparent plate, means for adjusting the mirror to receive the light rays reflected by the sheet when the latter is positioned upon said transparent plate, at a constant angle of incidence; means mounted upon the camera-carrying plate and co-operating with the mirror's mounting, whereby movement of said camera imparts motion to the mirror in a vertical line, the said mirror-adjusting means being adapted to set the mirror at such an angle with respect to the focal axis of the camera that the angle of reflection will be constant, the plane of the mirror, when adjusted, remaining the same relatively to the plane of the transparent copy plate throughout the vertical movement of the mirror.

RUPERT H. DRAEGER.